United States Patent
Saccomanno et al.

(10) Patent No.: US 6,735,844 B2
(45) Date of Patent: May 18, 2004

(54) METHOD FOR FABRICATING A PLASTIC OPTIC ELEMENT INJECTION MOLD

(75) Inventors: Robert J. Saccomanno, Montville, NJ (US); Clinton P. Kilroy, Neptune, NJ (US); Julius Puchammer, Edison, NJ (US)

(73) Assignee: Honeywell International Inc.

( * ) Notice: Subject to any disclaimer, the term of this patent is extended or adjusted under 35 U.S.C. 154(b) by 265 days.

(21) Appl. No.: 10/046,964

(22) Filed: Jan. 14, 2002

(65) Prior Publication Data

US 2002/0116808 A1 Aug. 29, 2002

Related U.S. Application Data

(60) Provisional application No. 60/262,802, filed on Jan. 19, 2001.

(51) Int. Cl.[7] .................. B22D 11/126; B22D 11/128
(52) U.S. Cl. .................. 29/527.6; 29/527.2; 29/527.4; 29/416; 29/557; 29/463; 76/107.1; 205/70
(58) Field of Search .............. 29/527.1, 527.2, 29/527.5, 527.6, 458, 463, 414, 412, 415, 416, 417, 527.4, 557, 558; 205/70; 76/107.1, 4, 107.4

(56) References Cited

U.S. PATENT DOCUMENTS

| 1,850,141 A | | 3/1932 | Rosenqvist |
| 2,182,775 A | * | 12/1939 | Abouchar .................. 249/135 |
| 2,243,521 A | | 5/1941 | Bishop |

(List continued on next page.)

FOREIGN PATENT DOCUMENTS

GB   740617 A   11/1955

OTHER PUBLICATIONS

International Search Report PCT/US02/00979; Jul. 24, 2002.
Bocking C. et al.: "Electrochemical Routes For Engineering Tool Production" GEC Journal of Research, GEC Marconi Research Center. Great Baddow Chemsford, GB, vol. 14, No. 2, 1997, pp. 66–74, XP000741098, ISSN: 0264–9187, para. 02.1–2.2.3.
Patent Abstracts of Japan, vol. 013, No. 494, Nov. 8, 1989, Toyota Motor Corp.

Primary Examiner—Essama Omgba
(74) Attorney, Agent, or Firm—Kurt Luther; James W. Falk (57) ABSTRACT

In order to produce precision optic elements using injection molded plastic, a metal mold is fabricated from two positive masters comprising exact metallic reproductions of the desired plastic part and on which a metal shell has been electroformed or otherwise plated. Two positive masters are required for each mold, one being formed to define the upper part of the mold and the other the lower part of the mold. Each positive master is scribed with an axial line and with a cutting line slightly offset from the axial line, the cutting line for the upper part of the mold being below the axial line and the cutting line for the lower part of the mold being above the axial cutting line. The positive masters are then cut along their cutting lines, the metal shells removed, and the portion of the remaining metal shells between their axial lines and their cutting lines is then trimmed. The upper and lower parts of the mold are then combined to define the complete injection mold.

13 Claims, 8 Drawing Sheets

U.S. PATENT DOCUMENTS

| | | | |
|---|---|---|---|
| 2,788,555 A | * 4/1957 | Sukacev | 164/34 |
| 2,838,961 A | * 6/1958 | Dalgleish et al. | 76/107.1 |
| 3,261,768 A | * 7/1966 | Sabin | 205/70 |
| 3,285,835 A | * 11/1966 | Farrow | 205/70 |
| 3,784,451 A | * 1/1974 | Garner | 205/70 |
| 3,840,977 A | * 10/1974 | Dimitracopoulos | 29/460 |
| 4,459,880 A | * 7/1984 | Giffune et al. | 76/107.1 |
| 4,808,272 A | * 2/1989 | Molitor | 205/70 |
| 5,488,763 A | * 2/1996 | Chen | 29/557 |
| 5,658,515 A | * 8/1997 | Lee et al. | 264/219 |
| 5,837,156 A | * 11/1998 | Cumming | 249/119 |
| 5,939,011 A | * 8/1999 | White et al. | 264/401 |
| 6,221,228 B1 | * 4/2001 | Irie et al. | 205/70 |
| 6,279,425 B1 | * 8/2001 | Cicotte | 76/107.1 |
| 2003/0146528 A1 | * 8/2003 | Huang | 264/2.5 |
| 2003/0164565 A1 | * 9/2003 | O'Brien | 264/2.5 |
| 2003/0218264 A1 | * 11/2003 | Akanabe et al. | 264/2.5 |

* cited by examiner

METHOD FOR FABRICATING A PLASTIC OPTIC ELEMENT INJECTION MOLD

CROSS-REFERENCE TO RELATED APPLICATIONS

This application claims priority from U.S. Provisional Patent Application Serial No. 60/262,802 entitled, "Injection Mold Manufacturing Process for Non-Imaging Optics", filed on Jan. 19, 2001. The contents of U.S. Provisional Patent Application Serial No. 60/262,802 are fully incorporated herein by reference.

FEDERALLY SPONSORED RESEARCH OR DEVELOPMENT

Not Applicable

BACKGROUND OF THE INVENTION

1. Technical Field

The present invention relates to the field of injection molding, and more specifically to a method of preparing a mold suitable for forming plastic optic components.

2. Background Art

Thick non-imaging optics, such as collimation and concentration non-imaging optics, are expensive because they are typically fabricated by machining glass. These thick non-imaging optics are typically characterized by a high aspect ratio and a number of extremely tight tolerances, including surface finish, flatness, concentricity, and perpendicularity. The cost of these optic elements can be reduced considerably by replacing the machined glass components with molded plastic components.

It is known in the art that such plastic optic elements can be molded, for example by injection molding, when the part geometry lends itself to molding. It is also known that manufacturing the molds for high aspect ratio plastic optic parts is extremely difficult.

There is a need for a method of producing molds suitable for injection molding fabrication of plastic optic components.

SUMMARY OF THE INVENTION

Our invention is a method for manufacturing molds suitable for the fabrication of optical components using injection-molded plastic. The injection molding materials that are suitable for use with our invention include but are not limited to cyclo-olefin polymer, clear acrylic resin, and polystyrene.

To fabricate the injection mold for a plastic optic element in accordance with our invention, metal models of the plastic optic element are first carefully machined to the exact dimensions of the desired plastic optic elements, but with adjustments to the dimensions to compensate for the determined rate of shrinkage, during curing, of the plastic when it is injected into the finished mold. Specifically, to fabricate the injection mold for the plastic optic part, two such machined models are employed. Each of these metal models then has coated thereon shells, as by electroforming, which shells conform exactly to the dimensions of the metal models. In further embodiments of our invention, more than two machined models and their corresponding shells are employed.

In accordance with an aspect of our invention, each shell including its encased metal model is then scribed on its outside with two lines, the first defining an axial line which, in one embodiment, splits the shell in two parts. Depending on the shape of the plastic optic element to be molded, the axial line may not split the shell into two equal size parts. The second scribed line is offset slightly from the first, being below the axial line for a first of the shells and above the axial line for the other of these shells. The shells are then cut along these second scribed lines, and the portion of the metal model away from the axial line and between the second cutting scribe line together with the outer shell formed thereon is then discarded.

What remains are two shell sections slightly larger than the dimensions of the desired plastic optic part with a part of the metal model still in these shell sections. Accordingly, in the next step, the remaining part of the metal model in the shell together with that portion of the shell between the axial line and the second cutting scribed line are then removed from each shell section. While the cutting operation along the scribed cutting lines may distort the dimensions of the outer shell adjacent to these cutting lines, in accordance with our invention, because the cutting of the shell is done away from the axial line, the cutting operation will not affect the desired dimensions of the finished mold when the two mold half shell sections are then joined together to form the finished injection mold.

DETAILED DESCRIPTION OF THE INVENTION

Mode(s) for Carrying Out the Invention

Figure 1:
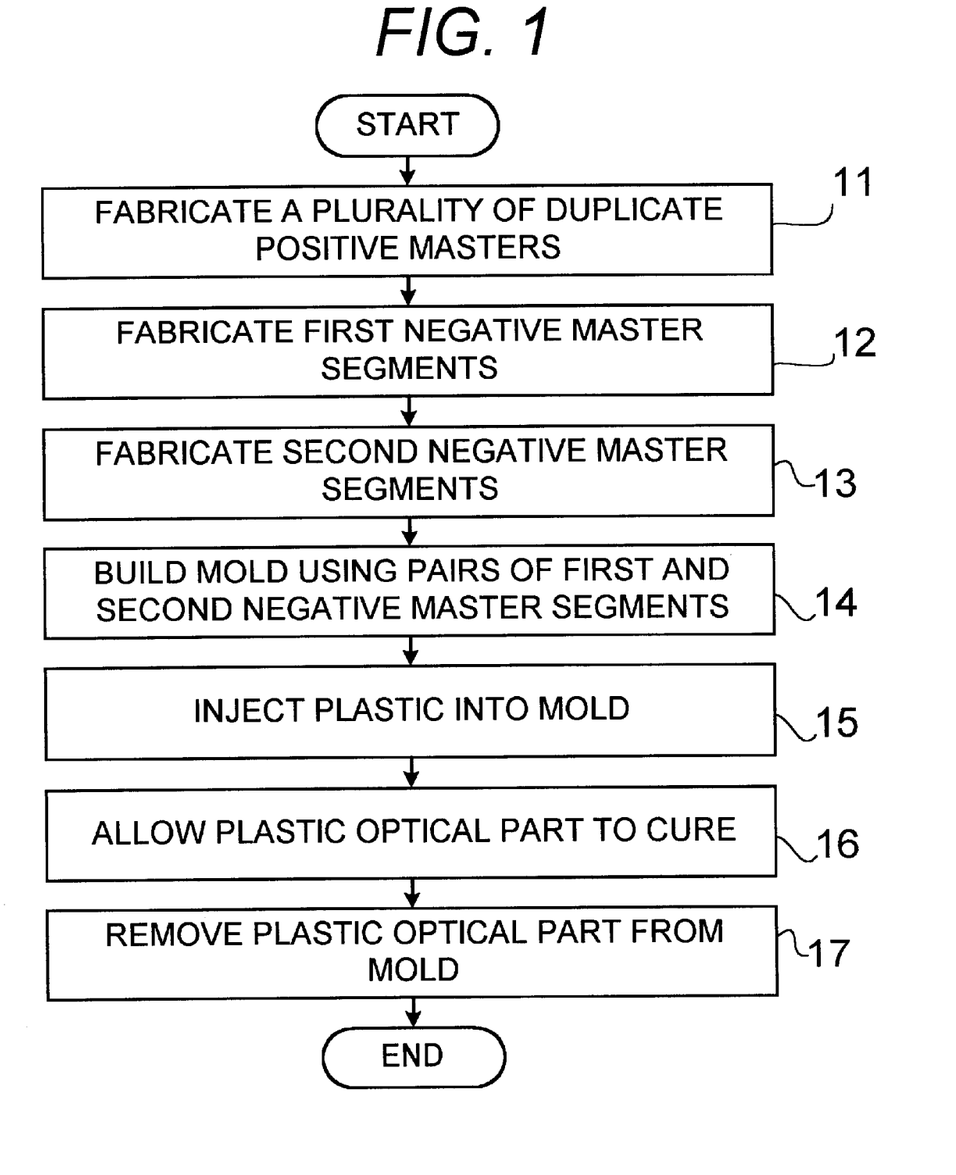
FIG. 1 is a flow chart illustrating the general procedure for manufacturing a mold for a high aspect ratio plastic optical part in accordance with the present invention.

Referring first to FIG. 1, the steps for manufacturing a high aspect ratio plastic optical part using a mold fabricated in accordance with our invention are shown. First, a pair of exact models or duplicate positive masters of the desired plastic optic component are fabricated (step 11), for example by machining a steel mandrel. Next, a first and second set of negative master segments are fabricated (steps 12 and 13), for example by electroforming shells around a first and second set of positive masters and then removing and trimming these electroformed shells in accordance with our invention. Next, a mold is built up (step 14) using the resulting first and second set of negative master segments.

Finally, plastic is injected into the mold (step 15), the plastic allowed to cure (step 16), and the finished optical part is removed (step 17).

Figure 2:
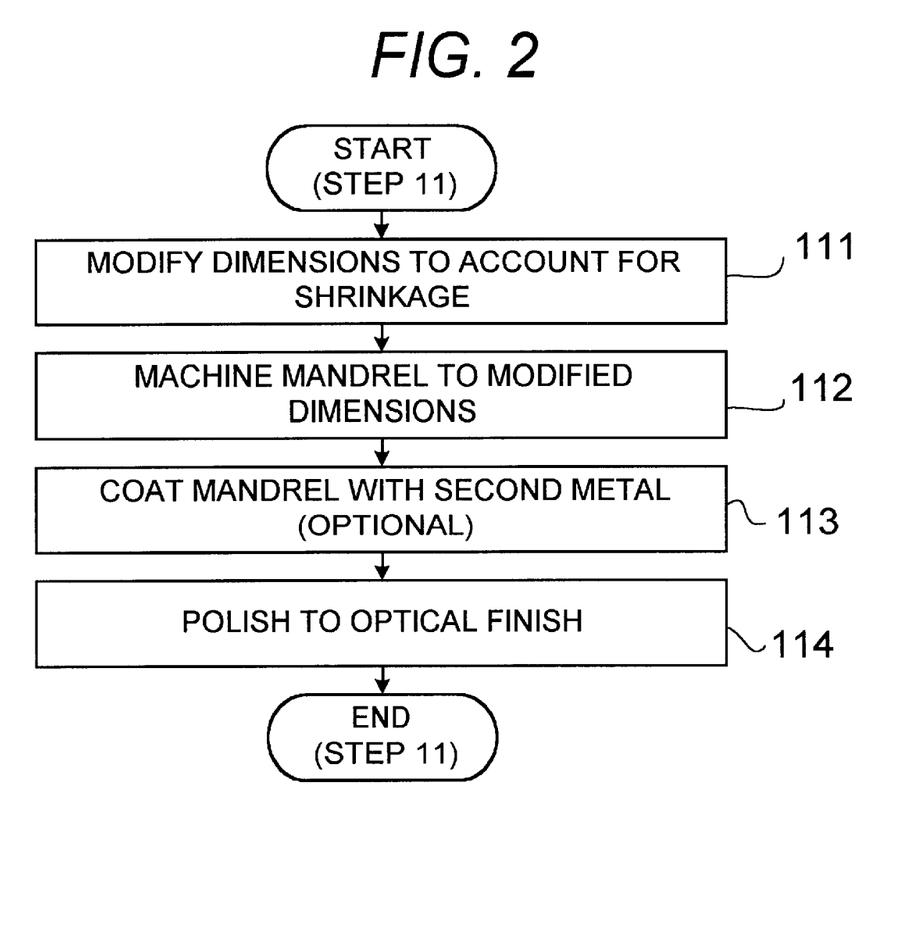
FIGS. 2, 3, and 4 illustrate specific details of the procedure of FIG. 1, in accordance with the present invention.

The detailed steps of fabricating the duplicate positive masters are shown in FIG. 2. First, the design dimensions of the finished optical part are modified (step 111), using computer-aided design (CAD) techniques, to take into account the shrinkage of the plastic material, such as cyroacrylic, during curing. Each duplicate positive master is machined (step 112) from a metal mandrel, such as steel or copper, to the modified dimensions of the finished optical part and polished to an optical surface finish (step 114), for example eighty (80) angstroms root-mean square (RMS) microroughness. In one embodiment, a steel mandrel is first diamond-turned on a lathe and then coated with a second metal (step 113), such as copper, before polishing (step 114).

Figure 3:
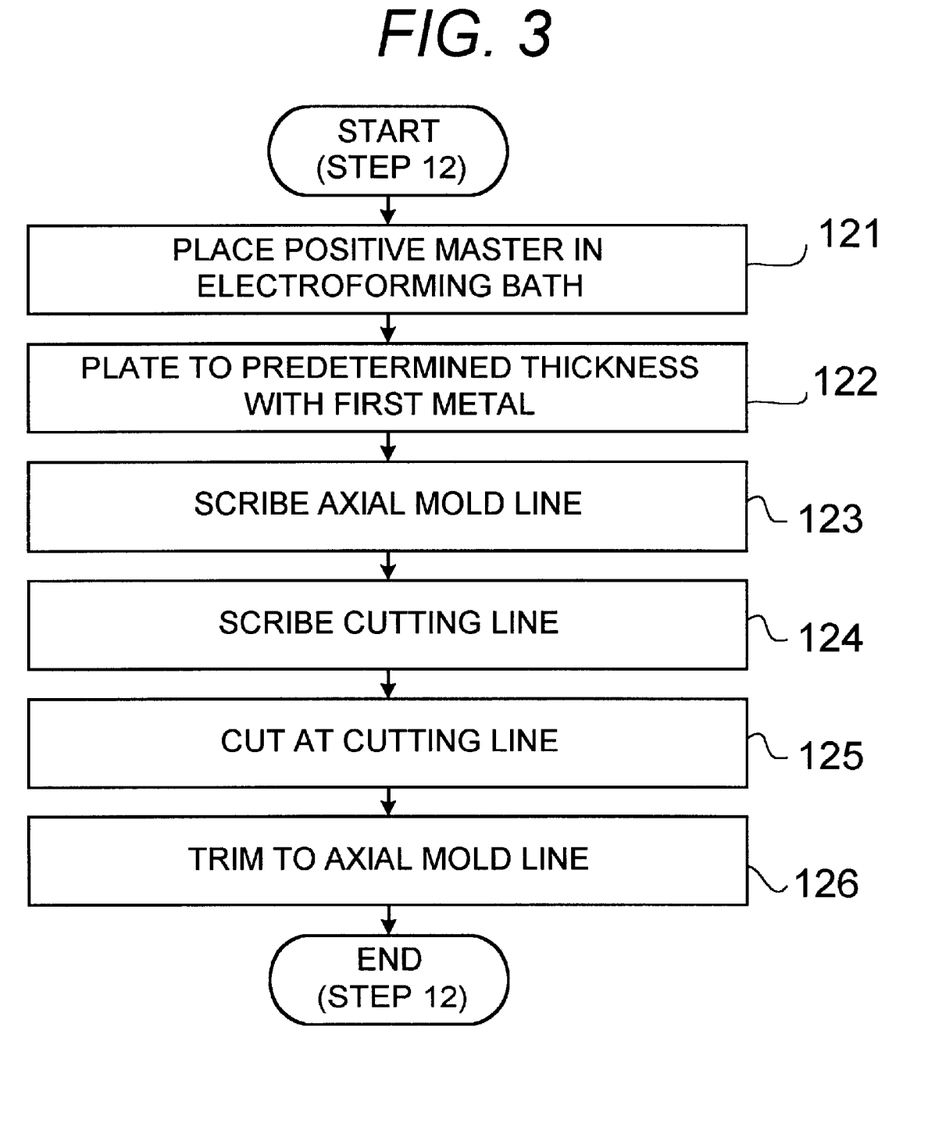

Referring now to FIG. 3 the detailed steps of fabricating the first negative master segment are shown. The metal model or positive master is placed in an electroforming bath (step 121) and is plated with a first hard plating metal to a predetermined thickness (step 122). In one embodiment of our inventive, the positive master is plated with nickel to a plating thickness of 0.625 millimeters (0.025 inches). The resulting combination of the positive master and its electroformed shell 51 are shown in FIG. 5.

Figure 5:
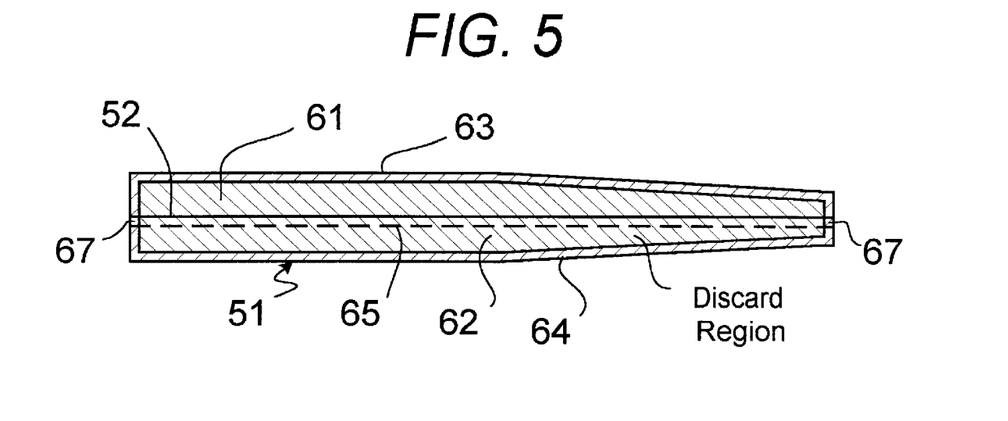
FIG. 5 depicts a machined mandrel with an electroformed shell surrounding the mandrel and illustrating a first discard region, in accordance with an illustrative embodiment of our invention.

Refer now to FIG. 5, which shows the mechanical arrangement of the first negative master segment and also continue to refer to FIG. 3. An electroformed shell 51 has been formed about a first positive master. The electroformed shell 51 is scribed (step 123) with an axial mold line 52 and then also scribed (step 124) with a cutting line 65, thereby defining a first negative master segment 63. In the embodiment illustrated in FIG. 5, the first negative master segment 63 is that portion of the electroformed shell 51 located above the axial mold line 52. A discard portion 64 of the electroformed shell 51 is located below the cutting line 65, and there is an overlap region 67 which is that portion of the electroformed shell 51 located between the axial mold line 52 and the cutting line 65.

Next, the positive master including its electroformed shell 51 is cut (step 125) at the cutting line 65 using, for example, wire-electrical discharge machining (EDM) and the discard portion 64 of the electroformed shell as well as the underlying discard region 62 of the positive master are removed and discarded.

At this point in our inventive process, the upper portion of the positive master includes both the desired negative master or shell section 63 together with its encased positive master model portion 61 as well as the overlap region 67 and the portion of the outer shell 63 between the axial line 52 and the cutting line 65. The outer shell section 63 of the mold is then removed from the retained and overlap portions, 61 and 67, of the model or positive master. Finally, that part of the outer shell 63 between the cutting line 65 and the axial line 52 is trimmed away, so that the remaining upper portion of the positive master or shell is exactly one half of the desired final mold.

By cutting along the scribed cutting line 65, and not along the axial line 52, any distortion of the mold shell section 63 due to the cutting operation is confined to that portion of the shell section 63 adjacent the overlap region 67, which section has been trimmed away.

Figure 4:
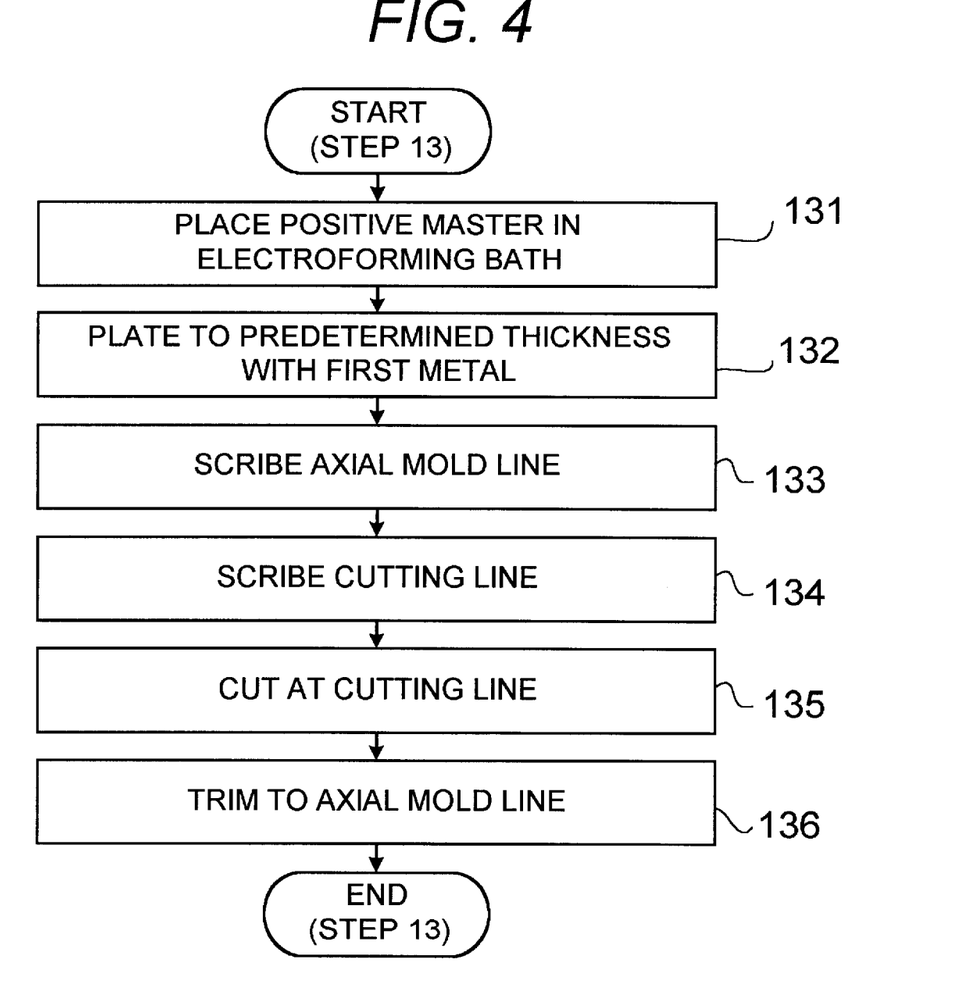
Figure 6:
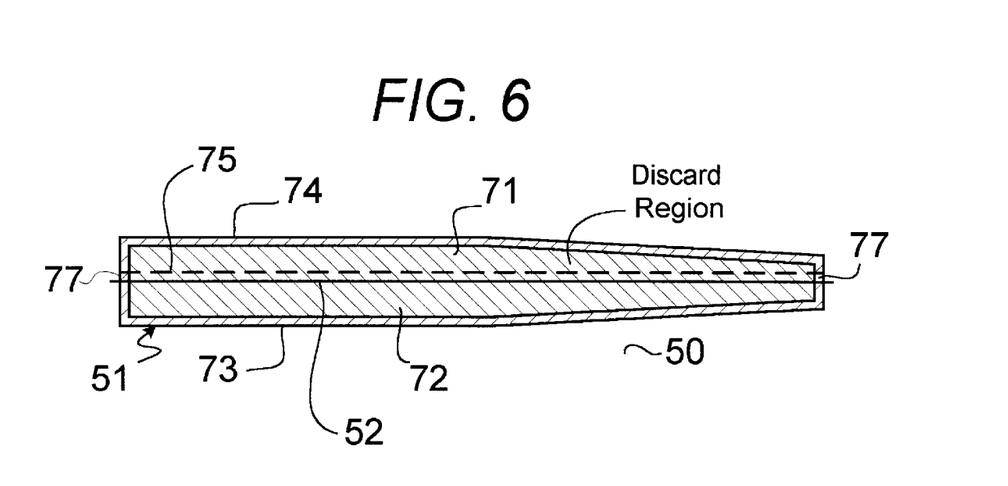
FIG. 6 depicts a machined mandrel with an electroformed shell surrounding the mandrel and illustrating a second discard region, in accordance with an illustrative embodiment of our invention.

Referring next to FIGS. 4 and 6, the second or lower negative master segment 73 is fabricated in a manner similar to the first negative master segment 63, with the exception that the second negative master segment 73 represents the opposite side of the optical component that will be molded. Fabricating the second negative master segment is accomplished by placing a positive master or metal model in an electroforming bath (step 131), plating an electroformed shell about the positive master (step 132), scribing an axial mold line 52 (step 133) and a cutting line 75 (step 134), cutting at the cutting line (step 135) and then trimming the second negative master segment to the axial mold line (step 136). Finally, just as described above, the second negative master segment 73 is separated from second retained region 72 of the positive master using techniques that are known in the art.

Figure 7:
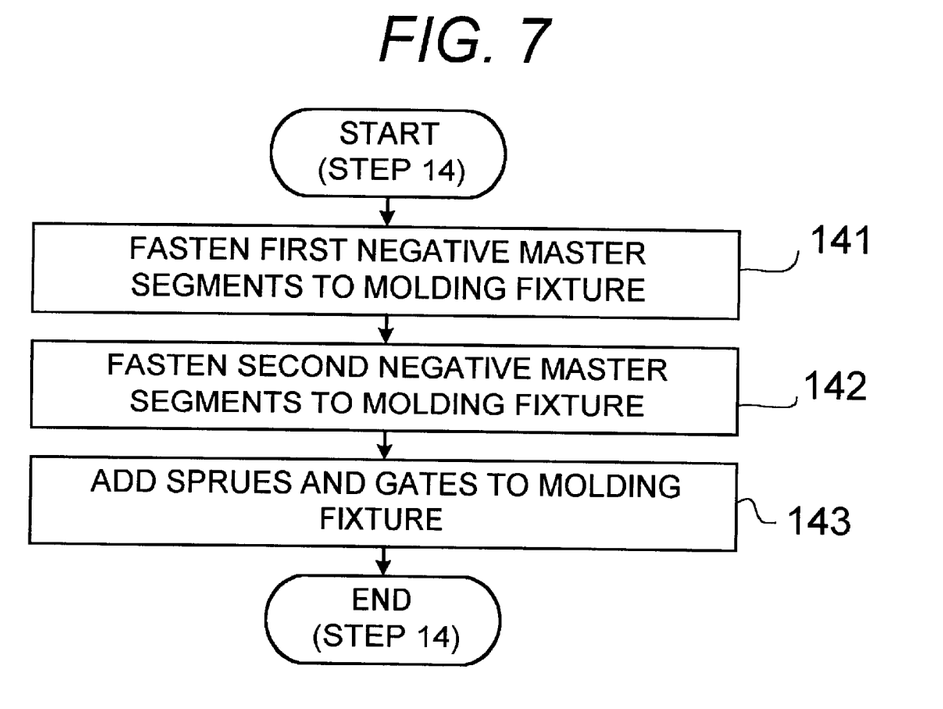
FIG. 7 illustrates specific details of the procedure of FIG. 1, in accordance with the present invention.

Refer next to FIG. 7, which depicts the steps of building up the mold for the optical component. Many optical components may be molded simultaneously. A plurality of upper negative mold segments are fastened (step 141) to a molding fixture and a plurality of lower negative mold segments are fastened (step 142) to the molding fixture. Sprues and gates added (step 143) as required, using techniques that are known in the field.

Figure 8:
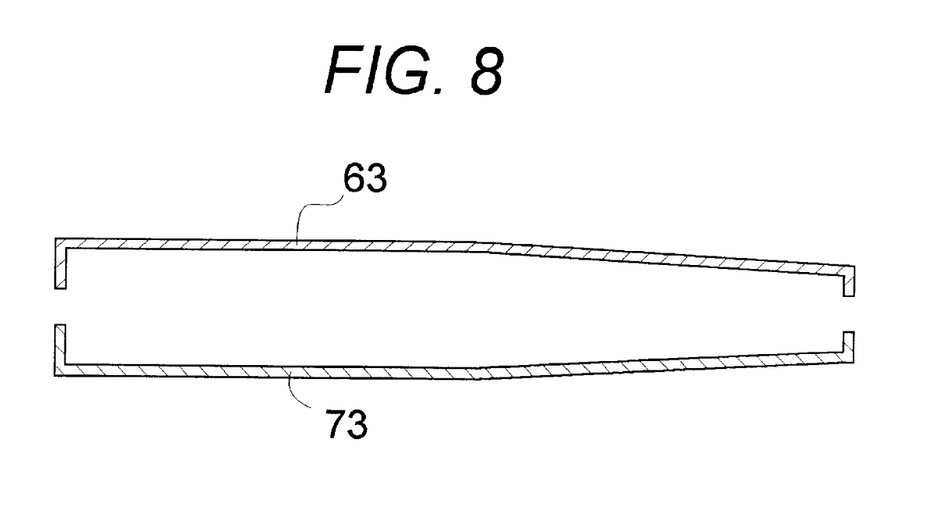
FIG. 8 depicts two halves of an injection mold that have been prepared from two separate negative masters in accordance with an illustrative embodiment of our invention.

Referring now to FIG. 8, an upper negative master mold segment 63, fabricated from a first positive master using the steps depicted in FIG. 3, and a lower negative master mold segment 73, fabricated from a second positive master using the steps depicted in FIG. 4, together completely define the finished optical component when combined together.

Figure 9:
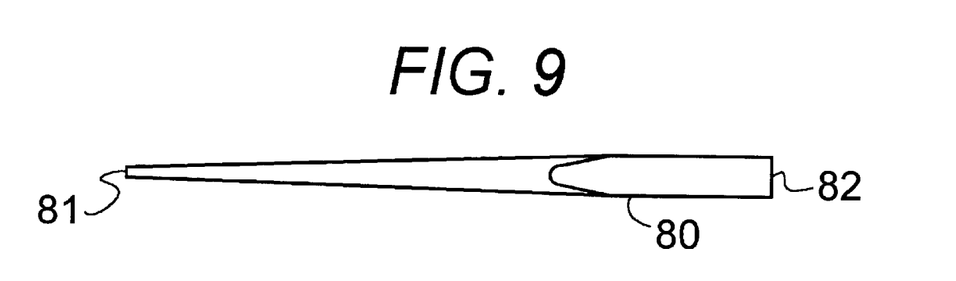
FIG. 9 illustrates a round-to-square morphing collimator, an example of a high aspect ratio plastic optical part fabricated by our inventive process.
Figure 10:
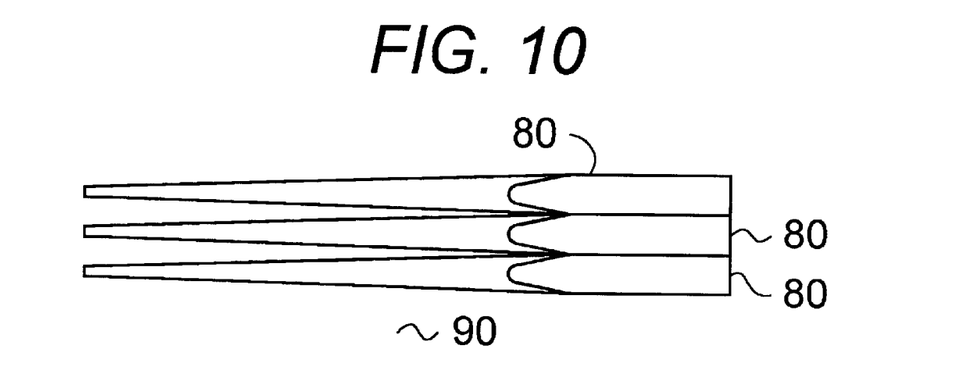
FIG. 10 illustrates the high aspect ratio optical parts of FIG. 9 arranged in an illustrative useful configuration.

Finally referring to FIGS. 9 and 10, a typical high aspect ratio optical component that may be fabricated using our invention is a square-to-round morphing collimator 80. These square-to-round morphing collimators 80 may be closely packed into array 90 and are especially useful for efficiently coupling round fiber optic cables into nonimaging outputs. Each of these morphing collimators 80 includes a round entrance, a square exit, a high aspect ratio of length to width, and critical optical tolerances. As described above, these morphing collimators 80 and other similar optical components can be molded from components from a variety of materials as cyclo-olefin polymer, clear acrylic resin, and polystyrene.

Advantageously, molding plastic optic components from plastic, using the methods of our invention, is considerably less expensive than machining such components from glass.

Whereas the drawings and accompanying description have shown and described the preferred embodiment of the present invention, it should be apparent to those skilled in the art that various changes may be made in the form of the invention without affecting the scope thereof. For example, there are embodiments of our invention wherein more than two metal models are used to make more than two negative mold segments.

What is claimed is:

1. A method for fabricating an injection mold for a plastic optical component comprising the steps of:
   (a) forming at least two metal models of the plastic optic component to be produced;
   (b) forming a metal shell on each of said metal models;
   (c) scribing an axial line on each of said metal shells;
   (d) cutting a first of said shells and an underlying first of said models along a line below its axial line and the other of said shells and an underlying other of said models along a line above its axial line;
   (e) discarding a portion of the metal shell and a portion of the metal model from the cutting line away from the axial line for each of said shells;
   (f) removing the metal model from the remaining of the metal shell and trimming a portion of the metal shell between its cuffing line and the axial line for each of said shells; and (g) combining the resulting two metal shell portions to form the injection mold.

2. The method in accordance with claim 1 wherein the step of forming said metal models includes the steps of:
   (a) determining the shrinkage rate of a plastic to be molded; and
   (b) adjusting dimensions of said models accordingly.

3. The method of claim 1, wherein said mold is suitable for injection molding of plastic materials selected from the group consisting of cyclo-olefin polymer, clear acrylic resin, and polystyrene.

4. A method for fabricating an injection mold suitable for forming a plastic optical component comprising the steps of:
   fabricating a plurality of duplicate positive masters of the optical component from a first metal;
   polishing each of said plurality of duplicate positive masters to an optical surface finish;
   placing each of said duplicate positive masters in an electroforming bath;
   electroforming a shell of a second metal on each of said duplicate positive masters to a predetermined thickness;
   scribing an axial mold parting line on each of said electroformed shells;
   cutting each of a set of positive masters along predetermined cutting lines to form a set of negative master segments, wherein each of the negative master segments comprises a portion of the electroformed shell about a positive master;
   trimming each of said negative master segments by removing an overlap region comprising a portion of the electroformed shell interposed between one of said predetermined cutting lines and said axial mold parting line;
   separating each of said positive master segments from each of said negative master segments to form a set of negative master mold segments; and
   building up a mold from a set of the negative master mold segments, wherein said set of negative master mold segments completely defines the plastic optical component.

5. The method of claim 4, further comprising the preliminary steps of:
   determining the shrinkage rate of a material to be molded; and modifying dimensions of said duplicate positive masters to compensate for said shrinkage rate.

6. The method of claim 5, wherein the step of modifying the dimensions of said duplicate positive masters is performed using computer-aided design techniques.

7. The method of claim 4, wherein said first metal is selected from the group consisting of copper, steel, copper-coated steel, and nickel-coated steel.

8. The method of claim 4, wherein said second metal is a hard metal.

9. The method of claim 8, wherein said hard metal is nickel.

10. A method for fabricating an injection mold for a plastic optical component comprising the steps of:
    forming two exact metal models of the plastic optic component to be produced by the mold;
    forming a metal shell on each of said metal models;
    defining a line through each of said shells, which lines delineate upper and lower portions of said shells, said upper portions being equal and said lower portions being equal;
    cutting one of said shells along a cut line above its delineating line and the other of said shells along a cut line below its delineating line;
    removing the portion of said one shell below its cut line and the portion of said other shell above its cut line;
    removing the part of the metal mold above its cut line from said one shell and the part of the metal mold below its cut line from said other shell;
    trimming away the segments of each shell between its delineating line and its cut line; and
    combining the remaining portions of said one and said other shell to form the injection mold.

11. The method in accordance with claim 10 wherein said step of forming two exact metal models includes the steps of:
    determining the shrinkage rate of a plastic to be molded; and
    adjusting dimensions of said models accordingly.

12. The method in accordance with claim 11 wherein the metal of said models is selected from the group consisting of copper, steel, copper-coated steel, and nickel-coated steel and the metal of said shells is nickel.

13. The method in accordance with claim 12 wherein said step of forming said metal shell on each of said molds comprises electroforming.

* * * * *